Figure 1:
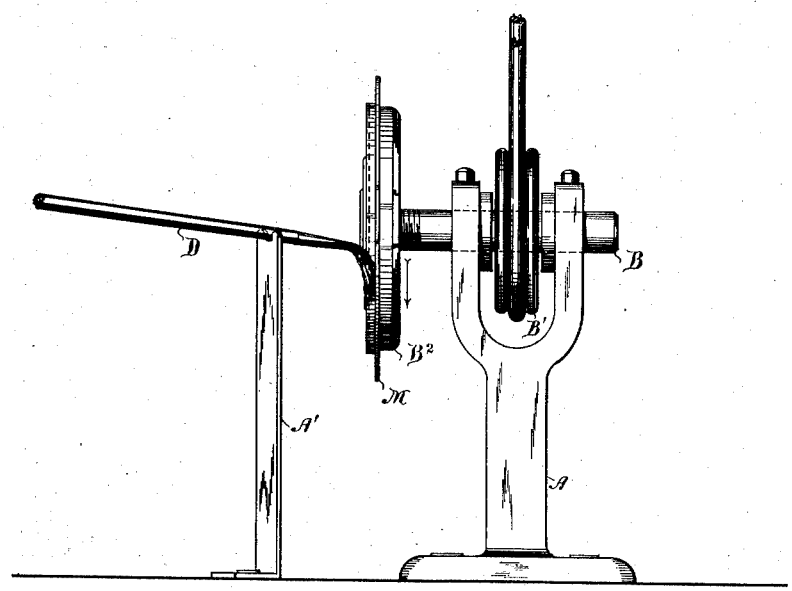

No. 868,916. PATENTED OCT. 22, 1907.
J. DIECKMANN.
METHOD OF CLOSING CANS.
APPLICATION FILED NOV. 18, 1902.

UNITED STATES PATENT OFFICE.

JOHN DIECKMANN, OF HOBOKEN, NEW JERSEY.

METHOD OF CLOSING CANS.

No. 868,916.  Specification of Letters Patent.  Patented Oct. 22, 1907.

Application filed November 18, 1902. Serial No. 131,816.

*To all whom it may concern:*

Be it known that I, JOHN DIECKMANN, a citizen of the United States, residing in Hoboken, in the county of Hudson and State of New Jersey, have invented certain new and useful Improvements in Methods of Closing Cans, of which improvements the following is a specification.

This invention relates more particularly to methods of hermetically securing covers to metal cans containing food (say, cooked and seasoned fish or other food to be preserved); but each of the improvements composing the invention is intended to be secured for all the uses to which it can be applied, with or without modification.

Commonly a hermetic joint has been formed between the cover and the can by the aid of solder with or without interlocking the margin of the cover with a flange on the can; but it has also been proposed to employ india rubber or cement of like nature as a filling between the folds of an interlocked joint. In accordance with the present invention, a varnish resin (most advantageously shellac) is employed in such joint. It is advantageously applied in the form of a volatile alcoholic solution; and it is also advantageously colored artificially by admixture of coloring matter therewith.

Varnish resin is hard, does not deteriorate with age, is strongly adherent to metal, is able to withstand the "processing" operation, is not affected by the liquids belonging to preserved food, gives rise to no substances injurious to health, is tough enough to be durable, and can be applied cold. A volatile alcoholic liquid is considered the best solvent for the resin, for one reason because it passes off quickly and entirely without leaving any objectionable residue.

As the resin itself is colorless, or nearly so, the addition of coloring matter (say, lamp black) thereto is advantageous in enabling the work people to perceive at once that the necessary coating has been applied preparatory to the formation of the interlocking joint.

So far as I am aware, I am the first to employ in an interlocked metal joint any plastic filler in the form of a volatile alcoholic solution, and also the first to use an artificially colored plastic filler and to mix coloring matter with a plastic filler of any description for such joint. The invention extends broadly to those features (separately and together), as well as to them (either or both) when used with shellac (or a varnish resin in general) as the plastic filler.

The filler is best made thin enough to be applied with a brush and is best applied therewith. By this means the filler can be applied in an even, thin coating, whereby there is a saving of material without loss of efficiency.

The following is a description of what is considered the best mode of carrying the invention into effect, it being understood that omissions, modifications and additions can be made indefinitely, so long as the substance of any one or more of the hereinafter written claims is taken.

Figure 2:
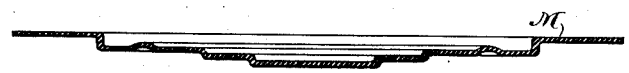
Figure 3:
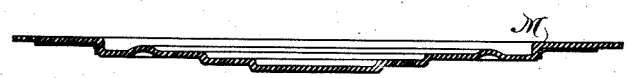
Figure 4:
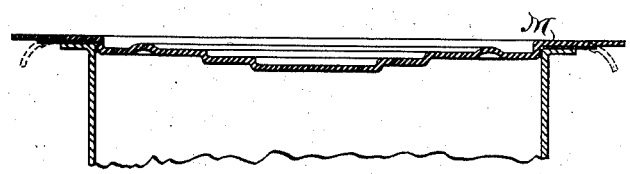
Figure 5:
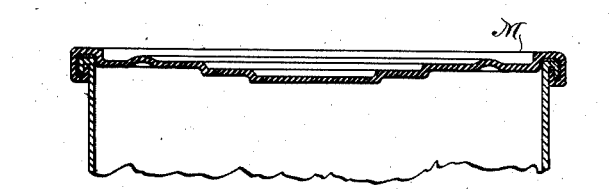
Figure 6:

In the accompanying drawings, Figure 1 is a view in elevation illustrating the operation of applying the filler to a can cover by means of a brush and a coöperating apparatus, which can advantageously be used for moving the cover in contact with said brush; Figs. 2 and 3 are views in section of the can cover before and after the application of the joint filler; Figs. 4 and 5 are views in section, showing the cover applied to the can before and after the formation of the interlocked joint; and Fig. 6 is a bottom view of a rectangular cover after application of filler to its margin.

The filler is best composed of four pounds of shellac and half a gallon of ordinary commercial wood alcohol with one ounce of lamp black for coloring matter. The shellac is dissolved in the wood alcohol and the lamp black mixed with the solution. With these proportions the filler, on the one hand, is sufficiently fluid to be applied with a brush, and, on the other, sufficiently viscous to furnish a coating which (while thin) will effectually fill the joint to be formed after its application.

The spindle B, journaled in bearings of the framing A, carries a chuck wheel B² (fast on said spindle) and is rotated by a belt on pulley B'. The stamped up cover M is placed on and held by the wheel B², so as to be revolved therewith. The workman, after dipping his brush D in the filler (of the before mentioned composition), applies the latter as a band to the under side of the margin of the cover M. During the operation he may rest the brush on the support A'. The rotation of the cover M brings the latter's margin in contact with the brush.

Owing to the fluidity of the filler, it is brushed on in a thin coating, which is made even and continuous by the rubbing action of the flexible brush on the traveling margin. The lamp black in the coating makes it readily perceptible by the workman.

The cover with coated margin is applied to the open top of the can which has a flange (as shown in Fig. 4). This flange and the margin of the cover are then folded together while the shellac is still plastic in an interlocked joint (Fig. 5), which is hermetically closed by the interposed filler. Known machines can be employed for forming the joint. In Fig. 4 the dotted lines indicate the margin of the cover after the ordinary double-seaming machine has commenced to fold the same, in the formation of the interlocked joint.

In use, for preservation of food, the can would be filled with the fish or other food before the application and securing of the cover. The can, with its contents and tight cover, would then be subjected (ordinarily at least) to the customary "processing" operation.

which consists in immersing the can in boiling water and then (when the heads have been temporarily sprung outward by inside pressure) pricking in the upper end a small hole to allow escape of steam and to be closed instantly thereafter, say, by touching it with solder.

I claim as my invention or discovery:

1. The method of closing a can by the aid of an interlocked joint between the cover and the can, consisting in applying varnish resin in a plastic state to one of the inside surfaces of such joint prior to the joint-forming operation, and then completing the joint while the applied varnish resin is plastic and consequently adapted hermetically to close said joint, substantially as described.

2. The method of closing a can by the aid of an interlocked joint between the cover and the can, consisting in applying varnish resin made plastic by volatile solvent to one of the inside surfaces of such joint prior to the joint-forming operation, and then completing the joint while the applied varnish resin is plastic and consequently adapted hermetically to close said joint, substantially as described.

3. The method of closing a can by the aid of an interlocked joint between the cover and the can, consisting in applying shellac in a plastic state to one of the inside surfaces of such joint prior to the joint-forming operation, and then completing the joint while the applied shellac is plastic and consequently adapted hermetically to close said joint, substantially as described.

4. The method of closing a can by the aid of an interlocked joint between the cover and the can, consisting in applying shellac made plastic by volatile solvent to one of the inside surfaces of such joint prior to the joint-forming operation, and then completing the joint while the applied shellac is plastic and consequently adapted hermetically to close said joint, substantially as described.

5. The method of closing a can by the aid of an interlocked joint between the cover and the can, consisting in applying varnish resin in the form of a volatile alcoholic solution to one of the inside surfaces of such joint prior to the joint-forming operation, and then completing the joint while the applied varnish resin is plastic and consequently adapted hermetically to close said joint, substantially as described.

6. The method of closing a can by the aid of an interlocked joint between the cover and the can, consisting in applying shellac in the form of a volatile alcoholic solution to one of the inside surfaces of such joint prior to the joint-forming operation, and then completing the joint while the applied shellac is plastic and consequently adapted hermetically to close said joint, substantially as described.

7. The method of closing a can by the aid of an interlocked joint between the cover and the can, consisting in applying varnish resin artificially colored and in a plastic state to one of the inside surfaces of such joint prior to the joint-forming operation, and then completing the joint while the applied varnish resin is plastic and consequently adapted hermetically to close said joint, substantially as described.

8. The method of closing a can by the aid of an interlocked joint between the cover and the can, consisting in applying shellac artificially colored and in a plastic state to one of the inside surfaces of such joint prior to the joint-forming operation, and then completing the joint while the applied shellac is plastic and consequently adapted hermetically to close said joint, substantially as described.

9. The method of closing a can by the aid of an interlocked joint between the cover and the can, consisting in applying a mixture of varnish resin and coloring matter in a plastic state to one of the inside surfaces of such joint prior to the joint-forming operation, and then completing the joint while the applied mixture is plastic and consequently adapted hermetically to close said joint, substantially as described.

10. The method of closing a can by the aid of an interlocked joint between the cover and the can, consisting in applying a mixture of shellac and coloring matter in a plastic state to one of the inside surfaces of such joint prior to the joint-forming operation, and then completing the joint while the applied mixture is plastic and consequently adapted hermetically to close said joint, substantially as described.

11. The method of closing a can by the aid of an interlocked joint between the cover and the can, consisting in applying a mixture of a solution of varnish resin in a volatile liquid and coloring matter to one of the inside surfaces of such joint prior to the joint-forming operation, and then completing the joint while the applied mixture is plastic and consequently adapted hermetically to close said joint, substantially as described.

12. The method of closing a can by the aid of an interlocked joint between the cover and the can, consisting in applying a mixture of a solution of shellac in a volatile alcoholic liquid and coloring matter to one of the inside surfaces of such joint prior to the joint-forming operation, and then completing the joint while the applied mixture is plastic and consequently adapted hermetically to close said joint, substantially as described.

13. The method of closing a can by the aid of an interlocked joint between the cover and the can, consisting in applying a plastic filler in the form of a volatile alcoholic solution to one of the inside surfaces of such joint prior to the joint-forming operation, and then completing the joint while the applied filler is plastic and consequently adapted hermetically to close said joint, substantially as described.

14. The method of closing a can by the aid of an interlocked joint between the cover and the can, consisting in applying an artificially colored plastic filler to one of the inside surfaces of such joint prior to the joint-forming operation, and then completing the joint while the applied filler is plastic and consequently adapted hermetically to close said joint, substantially as described.

15. The method of closing a can by the aid of an interlocked joint between the cover and the can, consisting in applying a plastic filler mixed with coloring matter to one of the inside surfaces of such joint prior to the joint-forming operation, and then completing the joint while the applied filler is plastic and consequently adapted hermetically to close said joint, substantially as described.

16. The method of closing a can by the aid of an interlocked joint between the cover and the can, consisting in applying a plastic filler in the form of an artificially colored solution in a volatile alcoholic liquid to one of the inside surfaces of such joint prior to the joint-forming operation, and then completing the joint while the applied filler is plastic and consequently adapted hermetically to close said joint, substantially as described.

17. The method of closing a can by the aid of an interlocked joint between the cover and the can, consisting in applying a plastic filler in the form of a solution in a volatile alcoholic liquid mixed with coloring matter to one of the inside surfaces of such joint prior to the joint-forming operation, and then completing the joint while the applied filler is plastic and consequently adapted hermetically to close said joint, substantially as described.

18. The method of closing a can by the aid of an interlocked joint between the cover and the can, consisting in applying varnish resin while fluid enough to be brushed on to one of the inside surfaces of such joint prior to the joint-forming operation, subjecting the so applied resin to the wiping operation of a flexible device, and then completing the joint while the applied varnish resin is plastic and consequently adapted hermetically to close said joint, substantially as described.

19. The method of closing a can by the aid of an interlocked joint between the cover and the can, consisting in applying varnish resin in the form of a solution in volatile liquid fluid enough to be brushed on to one of the inside surfaces of such joint prior to the joint-forming operation, subjecting the so applied resin to the wiping operation of a flexible device, and then completing the joint while the applied varnish resin is plastic and consequently adapted hermetically to close said joint, substantially as described.

20. The method of closing a can by the aid of an interlocked joint between the cover and the can, consisting in applying shellac while fluid enough to be brushed on to one of the inside surfaces of such joint prior to the joint-forming operation, subjecting the so applied shellac to the wiping operation of a flexible device, and then completing the joint while the applied shellac is plastic and consequently adapted hermetically to close said joint, substantially as described.

21. The method of closing a can by the aid of an interlocked joint between the cover and the can, consisting in applying a solution of shellac in a volatile liquid fluid enough to be brushed on to one of the inside surfaces of such joint prior to the joint-forming operation, subjecting the so applied shellac to the wiping operation of a flexible device, and then completing the joint while the applied shellac is plastic and consequently adapted hermetically to close said joint, substantially as described.

22. The method of closing a can by the aid of an interlocked joint between the cover and the can, consisting in applying a solution of shellac in a volatile alcoholic liquid artificially colored by admixture of coloring matter therewith and fluid enough to be brushed on to one of the inside surfaces of such joint prior to the joint-forming operation, subjecting the so applied shellac to the wiping operation of a flexible device, and then completing the joint while the applied shellac is plastic and consequently adapted hermetically to close said joint, substantially as described.

23. A can whereof the cover is united to the can body by means of an interlocked joint closed hermetically by a filler of varnish resin between the inside surfaces of said joint, substantially as described.

24. A can whereof the cover is united to the can body by means of an interlocked joint closed hermetically by a filler of varnish resin in the form of the residue left by evaporation of the volatile solvent from a solution of the varnish resin therein, said filler being between the inside surfaces of said joint, substantially as described.

25. A can whereof the cover is united to the can body by means of an interlocked joint closed hermetically by a filler of shellac between the inside surfaces of said joint, substantially as described.

26. A can whereof the cover is united to the can body by means of an interlocked joint closed hermetically by a filler of shellac in the form of the residue left by evaporation of the volatile solvent from a solution of the shellac therein, said filler being between the inside surfaces of said joint, substantially as described.

27. A can whereof the cover is united to the can body by means of an interlocked joint closed hermetically by a filler of varnish resin in the form of the residue left by evaporation of the volatile alcoholic solvent from a solution of the varnish resin therein, said filler being between the inside surfaces of said joint, substantially as described.

28. A can whereof the cover is united to the can body by means of an interlocked joint closed hermetically by a filler of shellac in the form of the residue left by evaporation of the volatile alcoholic solvent from a solution of the shellac therein, said filler being between the inside surfaces of said joint, substantially as described.

29. A can whereof the cover is united to the can body by means of an interlocked joint closed hermetically by a filler of artificially colored varnish resin between the inside surfaces of said joint, substantially as described.

30. A can whereof the cover is united to the can body by means of an interlocked joint closed hermetically by a filler of artificially colored shellac between the inside surfaces of said joint, substantially as described.

31. A can whereof the cover is united to the can body by means of an interlocked joint closed hermetically by a filler of varnish resin mixed with coloring matter between the inside surfaces of said joint, substantially as described.

32. A can whereof the cover is united to the can body by means of an interlocked joint closed hermetically by a filler of shellac mixed with coloring matter between the inside surfaces of said joint, substantially as described.

33. A can whereof the cover is united to the can body by means of an interlocked joint closed hermetically by a filler of varnish resin mixed with coloring matter and in the form of the residue left by evaporation of the volatile solvent from a solution of the varnish resin therein, said filler being between the inside surfaces of said joint, substantially as described.

34. A can whereof the cover is united to the can body by means of an interlocked joint closed hermetically by a filler of shellac mixed with coloring matter and in the form of the residue left by evaporation of the volatile alcoholic solvent from a solution of the shellac therein, said filler being between the inside surfaces of said joint, substantially as described.

35. A can whereof the cover is united to the can body by means of an interlocked joint closed hermetically by a filler in the form of the residue left by evaporation of the volatile alcoholic solvent from a solution of the filling material therein, said filler being between the inside surfaces of said joint, substantially as described.

36. A can whereof the cover is united to the can body by means of an interlocked joint closed hermetically by a filler of artificially colored material, said filler being between the inside surfaces of said joint, substantially as described.

37. A can whereof the cover is united to the can body by means of an interlocked joint closed hermetically by a filler of material mixed with coloring matter, said filler being between the inside surfaces of said joint, substantially as described.

38. A can whereof the cover is united to the can body by means of an interlocked joint closed hermetically by a filler artificially colored and in the form of the residue left by evaporation of the volatile alcoholic solvent from a solution of the filling material therein, said filler being between the inside surfaces of said joint, substantially as described.

39. A can whereof the cover is united to the can body by means of an interlocked joint closed hermetically by a filler of material mixed with coloring matter and being in the form of the residue left by evaporation of the volatile alcoholic solvent from a solution of said material therein, said filler being between the inside surfaces of said joint, substantially as described.

In testimony that I claim the invention above set forth I affix my signature, in presence of two witnesses.

JOHN DIECKMANN.

Witnesses:
  J. B. CLAUTICE,
  M. F. BOYLE.